June 21, 1938.　　　L. U. FRANKLIN　　　2,121,167
ACID TREATMENT OF PETROLEUM OILS
Filed Feb. 4, 1935　　　4 Sheets-Sheet 3
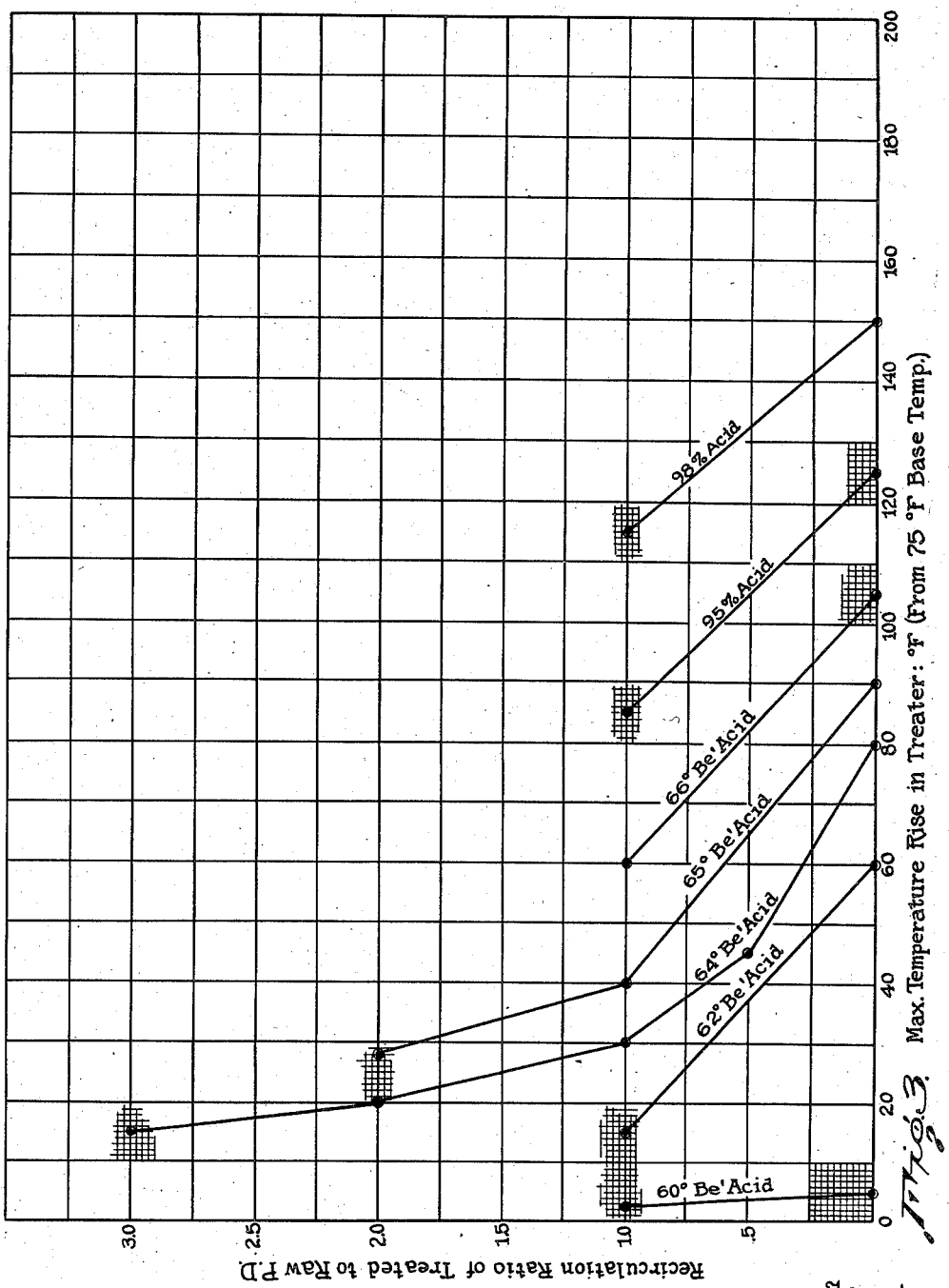

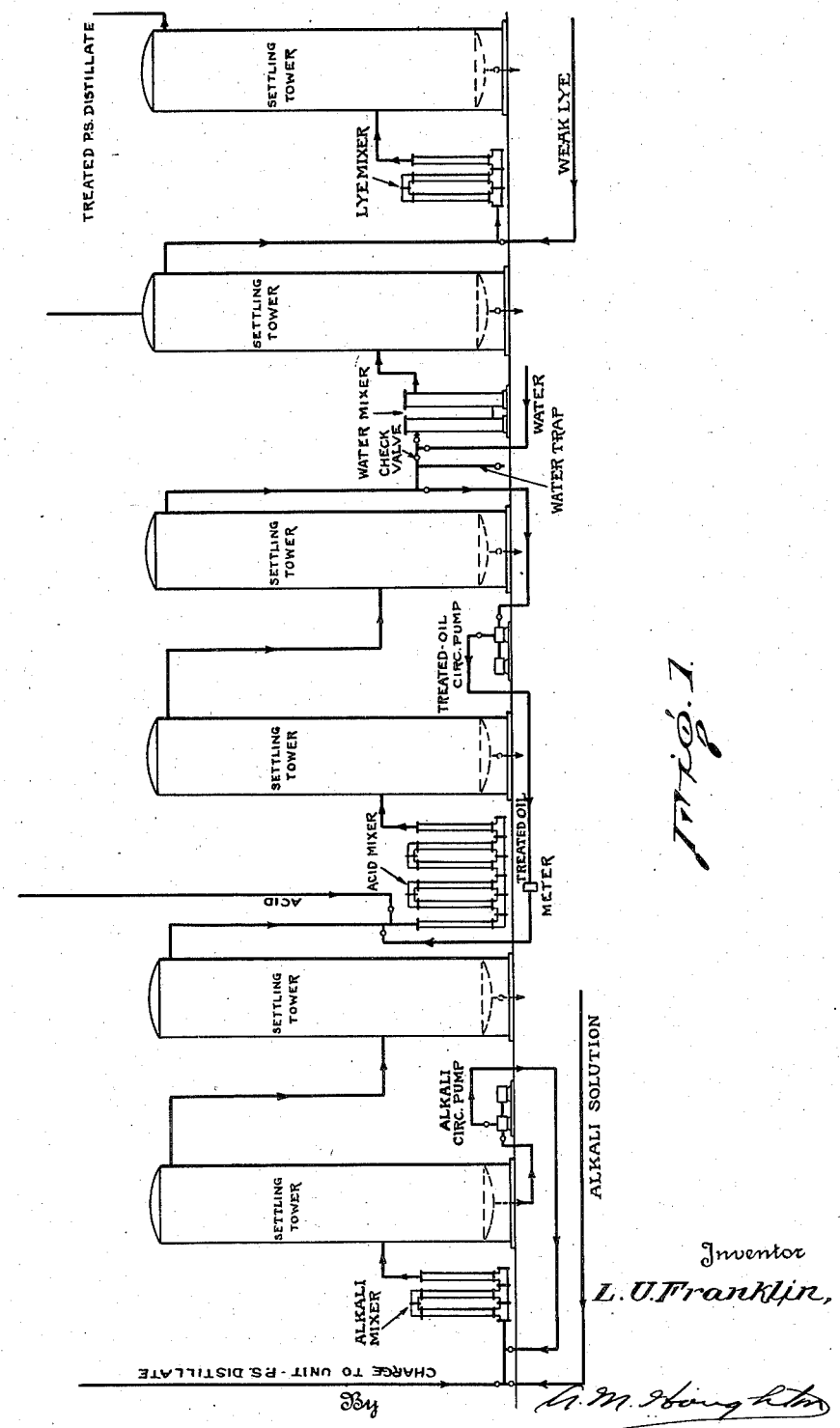

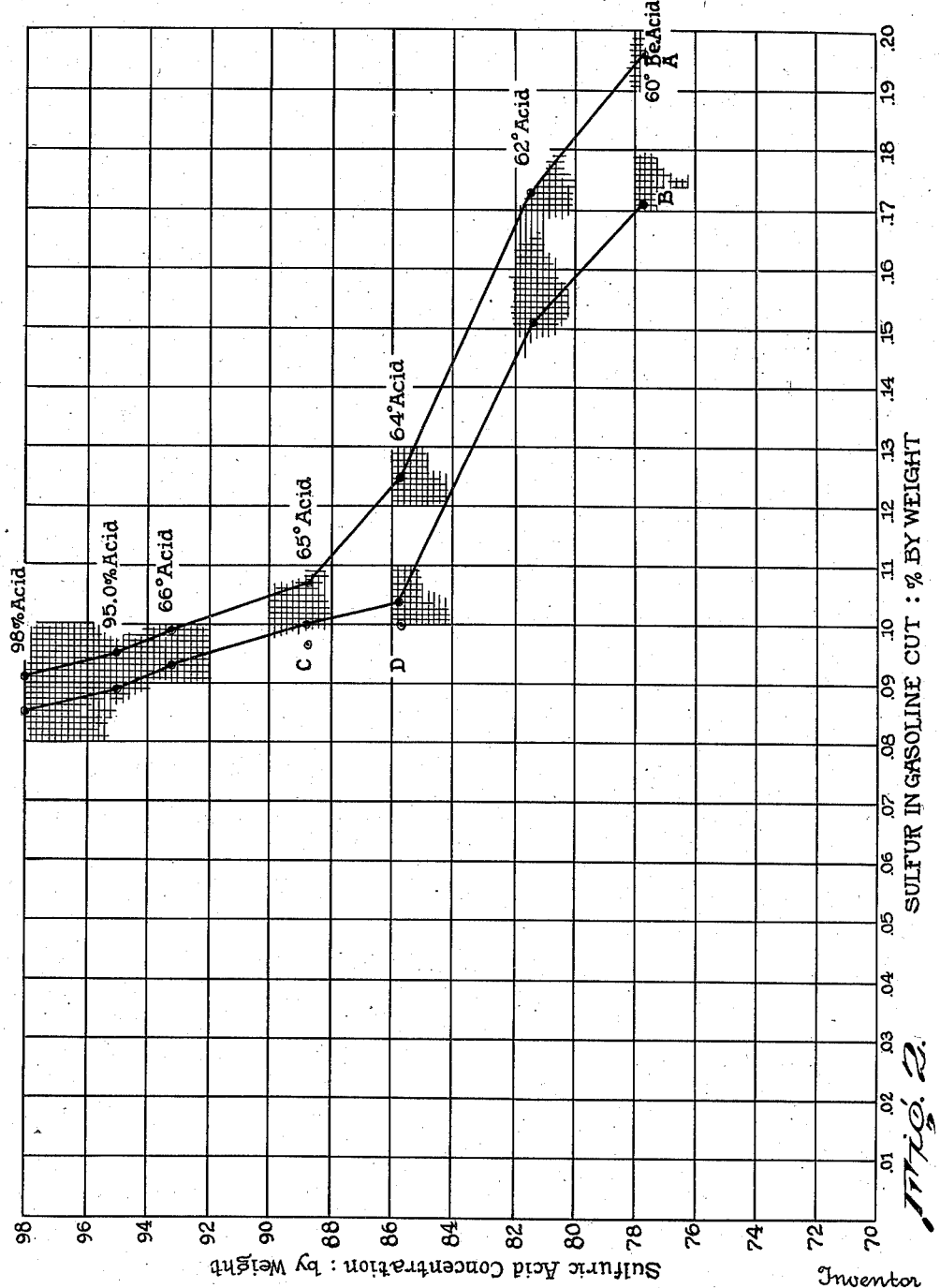

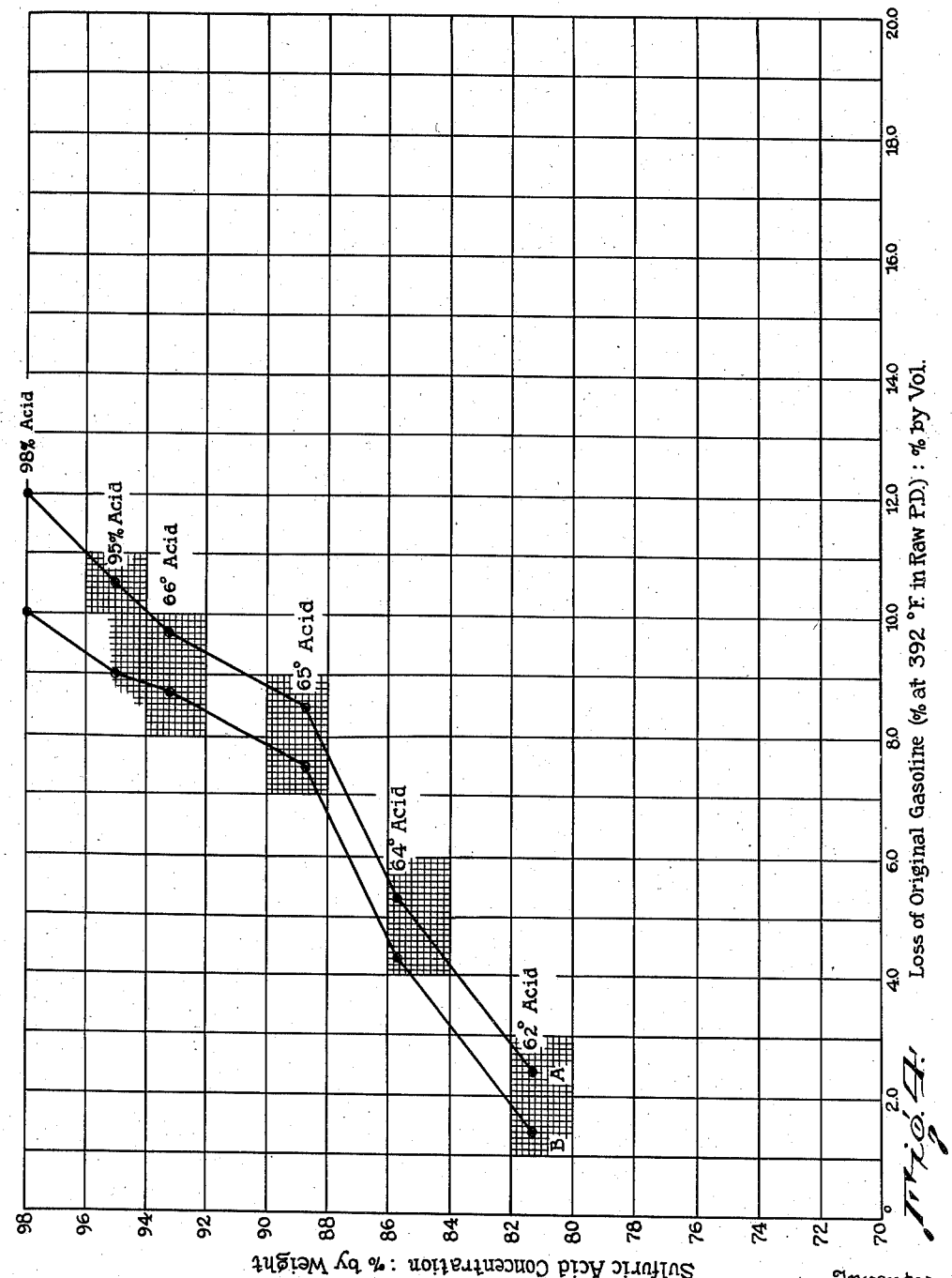

Patented June 21, 1938

2,121,167

UNITED STATES PATENT OFFICE 2,121,167

ACID TREATMENT OF PETROLEUM OILS

Leslie U. Franklin, Sweetwater, Tex., assignor, by mesne assignments, to Gulf Oil Corporation, a corporation of Pennsylvania Application February 4, 1935, Serial No. 4,930

5 Claims. (Cl. 196—40)

This invention relates to acid treatment of petroleum oils; and it comprises a method wherein untreated petroleum oil to be acid treated is admixed with a proportion of a petroleum oil which has been rendered resistant to sulfuric acid and the mixture is treated with sulfuric acid, the proportion of acid resistant oil being advantageously petroleum oil which has previously been subjected to treatment with sulfuric acid; all as more fully hereinafter set forth and as claimed.

Petroleum oils are customarily treated with sulfuric acid in refining. The sulfuric acid withdraws various constituents, some undesirable and some desirable. There is always some loss of valuable oil and it is a desideratum to reduce this loss. The particular strength of sulfuric acid used and the amount of treatment given vary with the oil and with the object desired. The action of the acid or the oil is not simple and results, as stated, in a loss of oil and in certain other undesirable results. To some extent it effects polymerization of olefins with production of higher boiling hydrocarbons; a result not desired with light oils of the type of gasoline and kerosene. The low boiling olefin oils are desirable constituents of gasoline. In acid treating gasoline there is frequently too much loss of these olefins.

In acid treatment, the oil is customarily agitated with the acid, allowed to quiet, and a layer of sludge withdrawn. This sludge contains the excess of sulfuric acid, some unchanged oil and various reaction products of the acid with oil constituents. It is usually diluted with water, the "sludge" oil which separates is removed and the residual acid is utilized in various ways; usually after purification and concentration. The action of the acid on the oil always develops heat; the temperature of the mixture in treatment rises.

I have found that if this development of heat be moderated by diluting the oil with another oil less attackable by sulfuric acid I obviate to a considerable extent undesirable side reactions; those leading to loss of oil and to formation of polymerized products of higher boiling point. And there is less useless consumption of acid. In practical embodiments of my invention, the diluent oil used is usually a portion of pre-treated oil from the process. A simple procedure is to pass oil through the treating apparatus and recycle a portion, after separating from the sludge and cooling; sending this portion back for admixture with the raw oil going to the apparatus.

It is customary to wash the oil with alkali after treatment with sulfuric acid. Sometimes, however, the oil is given a preliminary wash with alkali, then subjected to acid treatment and is finally washed again with alkali, this procedure being particularly advantageous in the treatment of light cracked distillates and resulting in economy of both acid and alkali. The acid treatment of the present invention is advantageously supplemented by alkali-washing according to either of the usual procedures above outlined.

While the method of the stated invention is applicable to other petroleum oils I regard it as particularly adapted for the treatment of pressure distillate; that is light distillate made by cracking heavier oil under pressure. The olefinic hydrocarbons in pressure distillates are valuable and it is desirable to minimize their loss in the sulfuric acid treatment as far as possible. This I do in the present invention.

By the dilution expedient I slow down the chemical actions attendant on the treatment of the oil with sulfuric acid, thereby moderating the temperature and limiting side reactions. The reactions are no longer so violent and far going and I find, by practical experience, that the utilization of the sulfuric acid is better; there is less unused acid in the sludge separated. Also, the sludge is less viscous and easier to handle.

Treatment of pressure distillates with sulfuric acid is often regarded as not economical—as being attended with too much loss. By the present invention treatment becomes economic.

One of the objects of acid treatment is the removal of sulfur compounds. The pressure distillate from many cracking stocks is high in sulfur compounds, which compounds are very detrimental in motor fuel and have to be removed from the gasoline fractions before the latter are marketable. Their removal has been accomplished in the past by treatment with sulfuric acid of 55° Bé., or stronger, followed by redistillation. The sulfur compounds are partially removed in the heavy sludge formed, but a portion remains in the acid-treated distillate. The compounds remaining in the distillate however have been so altered as to increase their boiling points and cause them to remain in the re-run bottoms on subsequent redistillation; they do not pass over with the gasoline vapors. This treatment with sulfuric acid, however, has the disadvantage of heavy losses of the desirable gasoline constituents present in the raw pressure distillate. The reaction between the acid and the gasoline components is not fully understood. It may be assumed that the losses are caused partly by evaporation from the heat of reaction, partly by inclusion in the sludge formed and partly by polymerization into heavier compounds which either separate out in the sludge formed or are of such a high boiling point as to preclude their recovery in the gasoline fraction.

In order to reduce the loss of gasoline constituents it has recently been proposed to treat pressure distillate with strong sulfuric acid at temperatures below normal whereby the evaporation losses are nearly eliminated and the other losses reduced. However, this cold treatment beside the expense of refrigeration has an additional disadvantage in that, on re-running the treated pressure distillate, more sulfur compounds distil over with the gasoline vapors than when re-running pressure distillate which is treated with sulfuric acid at normal temperature. I find that in treating pressure distillate by the methods of the present invention the loss of desirable constituents is greatly diminished, and further, that when the treated distillate is re-run, sulfur compounds remaining therein distil over with the gasoline to a less extent than previously.

In practical embodiments of the present process, I find that where sulfuric acid treatment of the undiluted oil would cause a rise in temperature to about, say, 155° F. on treating the diluted oil the rise in temperature is only to 105° F.; a reduction of 50° F. Comparing treatment of undiluted oil with diluted oil, all other conditions being the same, it is found that the loss of desirable compounds and the amount of sulfur-bearing bodies formed are both materially reduced. In certain comparative work, the density of the sludge acid withdrawn from the unmixed treated oil was 47° Bé. while with a diluted oil the density of the sludge was reduced to 42° Bé. The acid was better utilized in the process and the density of the sludge was correspondingly less.

In the accompanying drawings I have shown, more or less diagrammatically, one organization of apparatus elements useful in the performance of one specific process within the purview of my invention together with diagrams or charts illustrating results obtained by varying certain factors while treating diluted oil according to my invention as compared with results obtained by treating undiluted oil. In this showing:

Fig. 1 is a flow sheet illustrating a method for continuously treating pressure distillate;

Fig. 2 is a chart showing the effect of varying the concentration of the sulfuric acid used in treating on the sulfur remaining in an 85 per cent gasoline cut taken from the treated pressure distillate, comparative values being given for pressure distillate acid treated without dilution, treated when diluted in the ratio of 1 part treated to 1 part raw oil and treated when diluted in the ratio of 2 parts pretreated oil to 1 part raw oil;

Fig. 3 is a chart showing the effect of varying the ratio of treated to raw pressure distillate on the temperature rise in the treater, values being given for various concentrations of acid; and Fig. 4 is a chart showing the effect of variation in concentration of the sulfuric acid used in treatment on the total loss of the original gasoline present before acid treating, comparative values being given for treatment of undiluted raw pressure distillate and raw pressure distillate diluted by an equal volume of pretreated distillate.

Referring particularly to the flow sheet of Fig. 1, in which the successive operations proceed in general from left to right, the incoming charge of pressure still distillate is maintained in continuous flow. Alkali solution, usually a caustic soda solution of about 12.0 Bé. from a suitable source is introduced to the charge during the flow, the mixture agitated in a mixer and discharged into a settling tower from whence the separated oil is passed into a second similar tower. Advantageously, the alkali solution settling in the first tower may be circulated by a pump and returned to a fresh portion of charge before entering the mixer. After settling in the second settling tower the alkali-washed charge is drawn off.

According to what I consider to be the best embodiment of my invention the oil is at this point mingled with a stream of previously acid-treated oil derived from a subsequent step in the operation hereinafter described, the previously acid-treated oil being recycled and serving to dilute the alkali-washed charge. A flow of sulfuric acid of suitable strength and purity from any suitable source is introduced into the stream of diluted distillate and the mixture agitated in an acid mixer, from whence it flows through successive towers wherein acid sludge formed by reaction of the acid on oil is settled out. After leaving the second sludge settling tower the flow of acid-treated oil is divided into two streams, part of the oil being returned by a circulation pump to the stream of oil leaving the second alkali settling tower and mingling therewith prior to introduction of the acid. The remainder of the acid treated oil leaving the second acid sludge settling tower is passed through a water trap and then finished by being mingled with a stream of water and agitated therewith in a water mixer, after which the water is permitted to settle in a settling tower and the washed oil subjected to a final mixing with weak lye, usually caustic soda of 12.0 Bé. to neutralize any acid remaining in the oil. The lye is settled from the neutralized distillate and the so finished pressure distillate removed. The finished distillate is then ready for re-running into marketable gasoline. The purpose of the water trap indicated is to prevent water getting into the treated oil being recycled. Any water which is allowed to enter the stream of treated oil flowing to the acid mixer will cause the temperature in the acid mixer to rise.

In the subjoined table are given the comparative results obtained by treating pressure distillate without dilution and by treatment embodying dilution and recycling as shown in the flow sheet; the figures representing an average of results obtained over a period of a month or more.

*Table I*

| Method | Without dilution of charge | | Diluting charge by recycling in ratio of 1 part charge/1 part treated oil | |
|---|---|---|---|---|
| Strength of acid | 64° Bé. | | 64° Bé. | |
| Proportion of acid/bbl | 25 lbs. | | 25 lbs. | |
| Rise of temp. during treatment | 75° F. to 155° F. | | 75° F. to 105° F. | |
| Material | Untreated P. D. | Treated P. D. | Untreated P. D. | Treated P. D. |
| No. of samples | 19 | 19 | 41 | 41 |
| Gravity: °A. P. I. | 55.3 | 53.3 | 54.2 | 52.2 |
| Sulfur: Percent | 0.245 | 0.298 | 0.260 | 0.296 |
| Over point: °F | 102 | 107 | 107 | 111 |
| End point: °F | 443 | 519 | 470 | 526 |
| 10% at: °F | 157 | 165 | 156 | 165 |
| 50% at: °F | 275 | 290 | 273 | 287 |
| 90% at: °F | 390 | 419 | 407 | 428 |
| Percent at 365° F | 84.0 | 78.4 | 80.7 | 76.7 |
| Percent at 392° F | 90.1 | 85.0 | 87.0 | 83.6 |
| Recovery: Percent | 97 | 97 | 97 | 97 |
| Percent lost at 392° F | | 5.1 | | 3.4 |

It will be noted from the comparative tests indicated in Table I that in this particular instance the polymerization loss has been diminished 33.3%; the formation of sulfur bearing bodies diminished 32.1% and the rise of temperature reduced 62.5%.

The following tabulation gives the comparative results of re-running treated pressure distillate produced on the one hand by acid treating undiluted distillate and on the other by acid treating diluted distillate, the re-running being performed in an atmospheric-vacuum re-run still:

Table II

|  | P. D. treated without dilution | | P. D. diluted by recirculation method | |
| --- | --- | --- | --- | --- |
|  | Gasoline | Bottoms | Gasoline | Bottoms |
| Percent of charge | 81.80 | 17.20 | 85.12 | 13.02 |
| Gravity: °A. P. I | 57.4 | 30.5 | 56.0 | 29.3 |
| Sulfur: Percent | 0.125 |  | 0.104 |  |
| Over point: °F | 106 | 385 | 107 | 395 |
| End point: °F | 396 |  | 400 |  |
| 10% at: °F | 158 |  | 162 |  |
| 50% at: °F | 263 |  | 268 |  |
| 90% at: °F | 354 |  | 360 |  |
| Percent at 365 °F | 93 |  | 91 |  |
| Percent at 392 °F | 96 | 3 | 96 |  |

From the results indicated in Table II it is apparent that the gasoline yield has been increased 4.05%, while such gasoline contains 16.80% less sulfur than previously. These improvements are of great economic importance.

I have found it advantageous under different conditions to vary the process; for instance, to vary the ratio of oil recycled to oil being charged to the system, but, in general, I find a ratio of 1:1 to be satisfactory. The best proportion of treated oil to raw oil varies somewhat with the oil and with the particular strength of acid being used.

Referring particularly to Fig. 2, the values plotted on the chart as ordinates represent the concentration of sulfuric acid used in treating in terms of percentage by weight, while the values plotted as abscissae represent the percentage of sulfur by weight in 85 per cent gasoline cuts taken from the acid treated pressure distillate. The results shown were obtained by using the equivalent of 21.41 lbs. of 100 per cent $H_2SO_4$ per barrel of untreated pressure distillate. The values on the curve A are those for treatment of undiluted raw pressure distillate according to the prior art. The values along the line B are those resulting from treatment of pressure distillate by the method illustrated in the flow sheet of Fig. 1, the ratio of treated distillate recycled to that of raw distillate being in this instance 1:1. The points on the chart indicated by C and D show the results given respectively by treatments with 65° and 64° Bé. acid according to the method of the flow sheet when the ratio of pretreated oil to raw oil is 2:1. It will be aparent from inspection of this chart that treatment of pressure distillate according to the method of the present invention results in a treated distillate which on redistillation yields a gasoline containing appreciably less sulfur than that resulting from treatment and redistillation by the old method without dilution of the raw distillate.

Referring particularly to Fig. 3, the chart shows the maximum temperature rise in the treatment of pressure still distillate with different concentrations of $H_2SO_4$ and at different ratios of treated to raw pressure distillate in the charge being treated. In each instance the amount of acid used was the equivalent of 21.41 lbs. of 100 per cent $H_2SO_4$ per barrel of raw pressure distillate. It will be observed by reference to the chart that other conditions being the same the maximum temperature rise in the treater varies inversely as the ratio of treated to raw pressure distillate, the decrease in temperature rise per unit change in ratio of treated to raw distillate being generally greatest at low ratios.

Referring particularly to Fig. 4, the curves were obtained by plotting the concentrations of sulfuric acid as ordinates against the total treating loss of original gasoline in terms of percentage by volume of gasoline originally present at 392° F. in raw pressure distillate as abscissae. The curve A shows the results obtained by sulfuric acid treatment of undiluted raw pressure distillate and the curve B gives the results of treating raw pressure distillate diluted with an equal volume of pretreated distillate according to the method of this invention. It will be apparent at a glance that no matter what concentration of acid is used in treating, the percentage of gasoline lost is appreciably less in practicing the method of the present invention than in treating undiluted raw distillate according to prior practices. The loss represented by abscissae on the chart is the loss due to polymerization and sludge formation combined. The amount of acid used in treating was the equivalent of 21.41 lbs. of 100 per cent $H_2SO_4$ per barrel of raw pressure distillate.

It will be noted that in the foregoing description and in the flow sheet the recycling step for dilution purposes has taken place before the recycled oil has been washed with water. This is in the interest of economy, as such step saves needless processing of the oil recycled, but it is to be understood that whether operating in batch or continuous processes the washed product could also be employed as a diluent.

In the present specification and claims "raw oil" and "raw distillate" are used as convenient terms to indicate oil which has not been acid treated to any substantial extent.

What I claim is:

1. The process of refining gasoline distillate, which comprises washing such distillate with sulfuric acid in the presence of previously added refined oil of like character, removing acid sludge constituents from the treated oil, and adding a portion of the thereby purified oil as the aforesaid previously refined oil to a further quantity of oil prior to refining the resultant mixture as aforesaid, whereby acid-treating losses of the oil being refined are reduced due to the presence of the previously refined oil in the acid-treating stage.

2. The process of treating gasoline distillate which comprises washing the gasoline distillate with sulfuric acid, removing sludge, separating the purified oil into two portions and returning one of said portions to the aforementioned acid-treating stage for dilution of fresh oil to be refined in said acid-treating stage prior to contact of said oil with the acid employed in said acid-treating stage.

3. In the process of treating cracked gasoline distillate with sulfuric acid, such distillate being subject to heavy acid-treating losses when treated alone, the improvement which comprises diluting such distillate with previously acid-treated, sludge-free distillate of like character prior to treating said distillate with acid.

4. The process of claim 1 wherein the distillate is washed with acid in the presence of 0.5 to 3 times its volume of previously refined oil.

5. The process of claim 1 wherein the distillate is washed with acid in the presence of an equal volume of previously refined oil.

LESLIE U. FRANKLIN.